(12) United States Patent
Stein

(10) Patent No.: US 10,993,578 B2
(45) Date of Patent: May 4, 2021

(54) RAPID HEATLESS EXTRACTION OF FLAVORS FROM A SOLUBLE SUBSTANCE, METHOD AND SYSTEMS THEREOF

(71) Applicant: Brrrista Cold Brew LLC, Houston, TX (US)

(72) Inventor: Samuel Stein, Houston, TX (US)

(73) Assignee: BRRRISTA COLD BREW LLC, Houston, TX (US)

( * ) Notice: Subject to any disclaimer, the term of this patent is extended or adjusted under 35 U.S.C. 154(b) by 134 days.

(21) Appl. No.: 16/020,048

(22) Filed: Jun. 27, 2018

(65) Prior Publication Data

US 2018/0368612 A1 Dec. 27, 2018

Related U.S. Application Data

(60) Provisional application No. 62/525,534, filed on Jun. 27, 2017.

(51) Int. Cl.

| A47J 31/46 | (2006.01) |
|---|---|
| A47J 31/44 | (2006.01) |
| A47J 31/52 | (2006.01) |
| A47J 31/06 | (2006.01) |
| A23F 5/26 | (2006.01) |
| A47J 31/40 | (2006.01) |
| A47J 31/053 | (2006.01) |

(52) U.S. Cl.
CPC .............. *A47J 31/467* (2013.01); *A23F 5/26* (2013.01); *A23F 5/262* (2013.01); *A47J 31/053* (2013.01); *A47J 31/06* (2013.01); *A47J 31/40* (2013.01); *A47J 31/4403* (2013.01); *A47J 31/52* (2013.01)

(58) Field of Classification Search
CPC ........ A47J 31/467; A47J 31/053; A47J 31/06; A47J 31/40; A47J 31/4403; A47J 31/52; A23F 5/26; A23F 5/262
See application file for complete search history.

(56) References Cited

U.S. PATENT DOCUMENTS

| 3,418,973 A * | 12/1968 | Shinichi | A01K 63/003 119/226 |
|---|---|---|---|
| 3,595,623 A * | 7/1971 | Sperti | A47J 31/20 422/270 |
| 2007/0169633 A1* | 7/2007 | Beesley | A47J 31/467 99/279 |
| 2017/0035239 A1* | 2/2017 | Jagne | A47J 31/521 |
| 2018/0110363 A1* | 4/2018 | Glucksman | A47J 31/053 |

* cited by examiner

*Primary Examiner* — Anthony J Weier
(74) *Attorney, Agent, or Firm* — Arent Fox LLP

(57) ABSTRACT

Described herein are systems and methods for rapid heatless extraction of flavor from a soluble by a solvent. The system includes in one or more embodiments, a brewing chamber containing a soluble and a solution chamber containing a solvent with a filter between the two chambers, and a circulation pump for moving the solvent from one chamber to the other (i.e., agitation). The circulation pump recycles the solvent between the containers to form a solution that that reaches a static equilibrium of flow to and from the brewing chamber allowing the least saturated solution to be in contact with the soluble substance. In one or more embodiments, agitation is performed by beaters, propellers, magnetic mixers, rotation of one or more chambers, or by making a slurry mixture.

15 Claims, 16 Drawing Sheets

RAPID HEATLESS EXTRACTION OF FLAVORS FROM A SOLUBLE SUBSTANCE, METHOD AND SYSTEMS THEREOF

CROSS-REFERENCE TO RELATED APPLICATIONS

This application is based on and claims priority to U.S. Provisional Patent Application Ser. No. 62/525,534, filed Jun. 27, 2017, which is hereby incorporated by reference as if set forth in its entirety herein.

INTRODUCTION

Described herein are systems and methods for extracting soluble flavors from a substance without using heat.

BACKGROUND

The general concept of extracting flavors from a soluble by using a solvent in order to form a resultant solution is one that is well-known. One such common extraction practice is that of brewing coffee. When brewing coffee, water is used as a solvent to extract the coffee flavor from the coffee beans into a concentrated solution. The produced coffee flavor can be varied depending on the extraction method. For example, conventional cold brew coffee methods do not use hot water and brew a long period to produce a solution having a desirable flavor and chemical traits compared to brew methods involving heat. The lack of boiling reduces acidic taste, and the long time-extraction provides a stronger flavor and increased caffeine content.

One typical cold brewing method uses a brewing system having a container for water and a filtering device. Coffee grounds are measured and submersed in water in the container. The filtering device (e.g., a cheese cloth or stainless steel mesh) allows soluble flavors and caffeine to diffuse into the water while keeping larger insoluble coffee grounds separate. This process can take 12 to 24 hours depending on particular coffee blend used and the desired coffee concentration. After waiting the desired time period, a human operator removes insoluble material and any undesirable soluble material still remaining from the system using the filtering device. Another conventional method proceeds similarly as above, except that the water is slowly dripped onto the soluble coffee material and through the filtering device. Slow drip methods require large soluble to solution ratios, have long brew times, and are less efficient at extracting as much coffee soluble material.

Because conventional cold brewing methods take 1-2 days to produce a desirable product, in order to meet daily demand for cold brewed coffee, brewers typically produce large batches, dispense as necessary, and store leftovers for as long as two weeks in the brewing system. After two weeks, the taste has deteriorated, and what remains of the initial brew should be disposed. Since the product is kept in the brewing system, if the cold brew is in high demand, a brewer may also resort to brewing several batches simultaneously, requiring several brewing systems, which takes up a large amount of space. Additionally, if the brewed batch is stored outside of the brewing system and not refrigerated, such as at a coffee shop counter, the batch will spoil much faster, usually within 36 hours.

Therefore, what is needed are improved systems and methods of extracting flavor from a soluble to produce a desired solution, and in particular, systems and methods of heatless flavor extraction (i.e., cold brewing coffee) in less than 12-24 hours, thereby minimizing product waste and increasing product availability.

It is in regard to these issues and others that the present disclosure is provided.

BRIEF DESCRIPTION OF THE DRAWINGS

The invention is illustrated in the figures of the accompanying drawings which are meant to be exemplary and not limiting, in which like references are intended to refer to like or corresponding parts, and in which.

SUMMARY

Figure 1A:
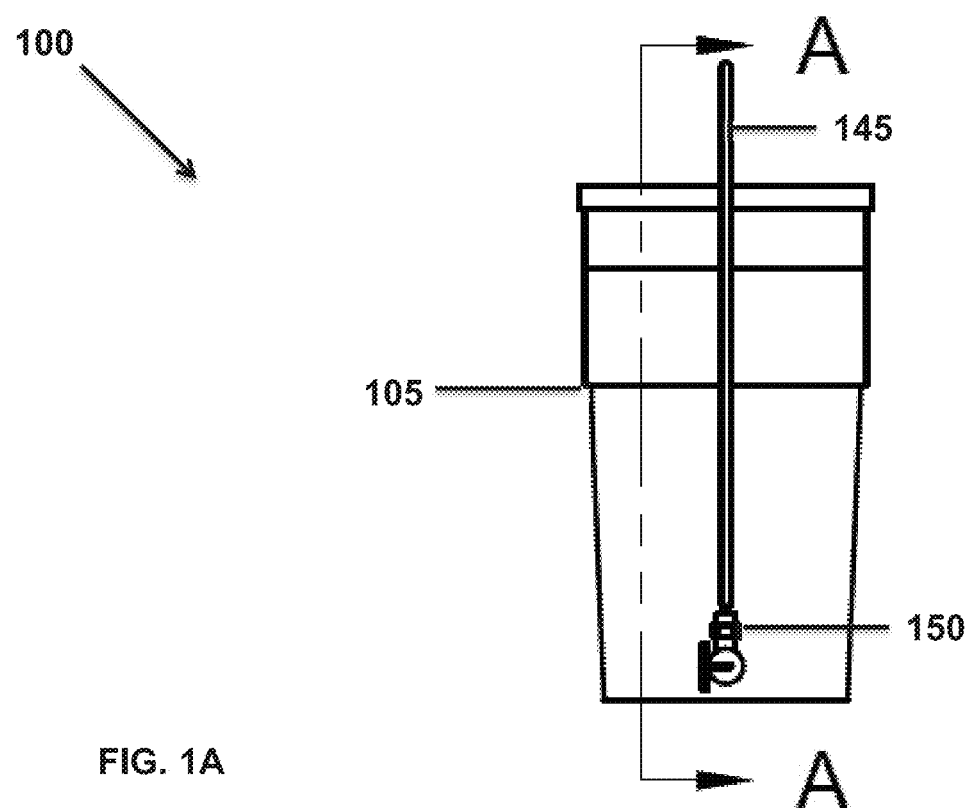
FIG. 1A presents a front view of a heatless system for extracting a soluble by a solvent to form a solution according to one or more embodiments described herein.

According to a broad aspect of the invention, systems and methods for heatlessly extracting a soluble in a solvent to form a solution are provided.

In accordance with one aspect of the invention, a heatless system for extracting a soluble in a solvent to form a solution includes a main frame. The main frame has a proximal end and a distal end, and an outer surface and an inner surface, each surface running from the proximal end to the distal end of the main frame. The system additionally includes a circulation pump having an inlet and an outlet. The circulation pump facilitates the flow of the solvent such that the solvent mixes with the soluble to form a solution in the brewing chamber. In one or more embodiments, the circulation pump is disposed within the brewing chamber. In one or more embodiments, the inlet of the circulation pump is coupled to the outer surface of the main frame.

Continuing with this aspect of the invention, in one or more embodiments, the system includes an intake tube having a first end and a second end, the first end being coupled to the outlet of the circulation pump and the second end coupled to a nozzle disposed at the inner surface of the proximal end of the main frame. A brewing chamber is disposed within the main frame. The brewing chamber can include an agitation mechanism, such as a beater, a propeller, a magnetic mixer, or a blade. The brewing chamber can be composed of a first brewing chamber and a second chamber in certain embodiments. In those embodiments, the first brewing chamber includes the soluble and the filter, and the second brewing chamber receives the solution passing through the filter. Optionally, the system includes a motor configured to rotate the first brewing chamber about a longitudinal axis of the first chamber as solvent is added. In one or more embodiments, the inlet of the circulation pump is arranged to receive solvent from the brewing chamber. Further, the system includes a filter disposed within the brewing chamber. The soluble can be disposed within the brewing chamber. In one or more embodiments, the soluble is disposed directly on or adjacent to the filter. In one or more embodiments, the system includes a shut-off switch, a timer, a serving valve, or a refrigeration system.

In accordance with another aspect of the invention, a heatless system for extracting a soluble in a solvent to form a solution includes a first brewing chamber and a second brewing chamber. In one or more embodiments, the first brewing chamber and the second brewing chamber are housed in a main frame. The system further includes one or more solvent permeable filters. For example, the solvent permeable filters are contained in the first brewing chamber or the second brewing chamber. In other embodiments, the filters are contained only in one of the first brewing chamber or the second brewing chamber. In one or more embodiments, the filters separate the first brewing chamber and the second brewing chamber. In one or more embodiments, the soluble is disposed in the first brewing chamber on or adjacent to the filters. Moreover, a circulation pump is having an inlet and an outlet is provided. The circulation pump facilitates the flow of the solvent such that the solvent mixes with the soluble to form a solution. In one or more embodiments, the circulation pump is disposed in the second brewing chamber. In one or more embodiments, the solution is formed in the second brewing chamber. The system also includes an intake tube having a first end and a second end, the first end being coupled to the outlet of the circulation pump.

Continuing with this aspect of the invention, the system includes a passageway passing between the first and second brewing chambers in one or more embodiments. The intake tube may be coupled to or pass through the passageway. In one or more embodiments, the system further includes a supporting platform. For example, the supporting platform can be positioned below the first and second brewing chambers and can have slots sized and shaped to receive the first and second brewing chambers. In one or more embodiments, the circulation pump is disposed within the supporting platform. In one or more embodiments, the passageway is contained in the supporting platform.

In accordance with another aspect of the invention, a method of heatlessly extracting a soluble in a solvent to form a solution is provided. The method includes inserting the soluble into a first brewing chamber. Next, the method includes inserting the solvent in a second brewing chamber. Thereafter, the solvent is circulated from the second brewing chamber to the first brewing chamber such that the solvent mixes with at least a portion of the soluble to form a partial solution. The partial solution is then strained through a filter in the first brewing chamber into the second brewing chamber. After that, the partial solution mixes with the solvent in the second brewing chamber, and the partial solution is circulated with the solvent into the first brewing chamber. In one or more embodiments, the previous steps are repeated until the partial solution reaches a desired concentration or for a set time. In one or more embodiments, the step of circulating the solvent can include pumping the solvent through an intake tube and spraying, via a nozzle, the solvent on the soluble. In one or more embodiments the step of circulating the solvent can include pumping the solvent through an intake tube and rotating the first brewing chamber about a longitudinal axis of the first chamber as solvent is added.

These and other aspects, features, and advantages can be appreciated from the accompanying description of certain embodiments of the invention and the accompanying drawing figures and claims.

DETAILED DESCRIPTION

Throughout the specification, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. Similarly, the phrase "one or more embodiments" as used herein does not necessarily refer to the same embodiment and the phrase "at least one embodiment" as used herein does not necessarily refer to a different embodiment. The intention is, for example, that claimed subject matter includes combinations of example embodiments in whole or in part.

The present disclosure presents systems and methods for rapid heatless extraction of flavor from a soluble substance. In particular, the present systems and methods are suitable for the cold brewing of coffee, though one of ordinary skill in the art may apply the techniques described herein in similar fields that implement heatless extraction techniques. In contrast to conventional cold brewing techniques, which take 12 to 24 hours to extract the flavor from the coffee grounds (i.e., the soluble), the present disclosure provides systems and methods in which the time to brew is reduced to 2-4 hours. Advantageously, the reduced time to brew means that the system can be encompassed in a smaller apparatus than is conventionally available, as long-term storage is less important if a new batch can be brewed in a shorter time.

In one aspect, the system for rapid heatless extraction of flavor from a soluble substance by a solvent is able to reduce brewing times by continuously agitating the solvent over the soluble for the duration of brewing. In one or more embodiments, the system includes a container having the soluble and solvent stored within the container and separated by a filter. The container, or main frame, can be composed of several sub-containers or sub-chambers. For example, the soluble may be stored in brewing chamber and the solvent may be stored in a solution chamber. In one or more embodiments, the brewing chamber and the solution chamber are disposed within the container. For example, the brewing chamber and the solution chamber can be disposed within a main frame of the container, with the brewing chamber being disposed above the solution container, and having a filter separating the two chambers. In one or more embodiments, the soluble is coffee grounds and the solvent is water. The present disclosure is not meant to be limited to flavor extraction from coffee grounds, as other soluble and solvent may be used in the methods described herein, such as tea, infusion of flavor into alcohol, and the like. An agitation mechanism, such as a circulation pump, circulates the solvent between the two chambers, thereby agitating the soluble by the solvent. This mixing creates a partial solution of the soluble and the solvent, which passes through the filter into the solution chamber. The partial solution is then recycled into the brewing chamber for a pre-determined time or until a desired concentration of the soluble flavor in the solution is reached.

The agitation process may be accomplished in additional ways by other agitation mechanisms beyond using a circulation pump. In one or more embodiments, the system includes a mixing device in the brewing chamber. For example, the mixing device can be one or more beaters, one or more propellers, or one or more magnetic mixers. In other embodiments, the mixing device and the brewing chamber are the same component. For example, the brewing chamber can be configured to rotate, thereby acting also as a mixing device. In one or more embodiments, the system includes a motor for rotating a portion of the system to cause agitation of the solvent to the soluble. For example, the motor can be used to rotate the brewing chamber, the solution chamber, or both. In one or more embodiments, the system creates a vacuum in the brewing chamber and forces the solvent into the brewing chamber to the soluble to create a partial solution. Thereafter, the partial solution is forced through a filter to the solvent container to mix with additional solvent. The resulting solution is recirculated to the vacuum brewing chamber until a desired concentration is reached.

Further, as the systems and methods herein rely on fluid flow, they advantageously can avoid relying on pressure or vacuum based techniques. In pressure/vacuum-based techniques, the boiling point of water is artificially lowered by lowering the pressure in the system. In contrast, the systems herein are truly "heatless" as they are designed to operate at standard pressures and do not require sophisticated vacuum sealing techniques.

Moreover, the present systems and methods achieve rapid heatless extraction via a single circulation pump and the pull of gravity. This reduces cleaning time and operational costs.

With reference now to FIGS. 1A, 1B, 2, 3A and 3B, a heatless system 100 for extracting a soluble by a solvent to form a solution according to one or more embodiments is provided. The system 100 includes a main frame 105 that houses the brewing process. The main frame 105 can be made out of various materials, including plastic, aluminum, steel or other metals, or other suitable materials. In one or more embodiments, the main frame is an elongated hollow container. A brewing chamber 110 and a solution chamber 115 are disposed within the main frame 105. The brewing chamber 110 and solution chamber 115 can be interpreted as a single chamber having internal separation, or can be wholly separate chambers. In one or more embodiments, the brewing chamber 110 can be considered a "first brewing chamber" and the solution chamber 115 can be considered a "second brewing chamber." Each of these chambers can be made out of various materials, including the same or different materials as the main frame 105, such as plastic, aluminum, steel or other materials. Each chamber is hollow to be able to store soluble or solvent materials, and the resultant solution of brewing methods implemented by system 100. In one or more embodiments, a filter 120 separates the brewing chamber 110 and the solution chamber 115. In one or more embodiments, the filter 120 is housed within the main frame 105. In one or more embodiments, the filter 120 is a membrane capable of allowing solvent and solution to pass through the filter, while retaining soluble. For example, the filter 120 is a cheese cloth, metal grating, nut milk sack or other similar filtering device.

The system 100 stores a soluble 125 in the brewing chamber 110 and a solvent 130 in the solution chamber 115. In one or more embodiments, the soluble 125 is coffee grounds and the solvent 130 is water. The type of filter 120 is selected to retain the soluble 125 in the brewing chamber 110 as the system 100 agitates the solvent 130 over the soluble. At one end of the main frame 105, a lid 135 is secured to the brewing chamber 110 to fully enclose the soluble 125. In one or more embodiments, after inserting the soluble 125 into the brewing chamber 110, a locking mechanism secures the brewing chamber during agitation (not shown). In one or more embodiments, the lid 135 includes an opening for passing a nozzle 140 through. The nozzle 140 is coupled to a first end of an intake tube 145, and the second end of the intake tube is coupled to a circulation pump 150. The circulation pump 150 is connected to a power supply 155. The circulation pump 150 is a pump as is known in the art for receiving a liquid (e.g., the solvent) and pushing it in a direction against gravity.

In one or more implementations of system 100, the circulation pump 150 has an inlet 152 and an outlet 154, the inlet being coupled to the main frame 105 to access to the solution chamber 115, and the outlet being coupled to the second end of the intake tube 145. In this way, the solvent 130 is received by the circulation pump 150 and pushed to flow through the intake tube 145 to the nozzle 140, where it is thereafter sprayed on the soluble 125. In one or more embodiments, the circulation pump 150 and the intake tube 145 are disposed outside of the main frame 105. In one or more embodiments, the circulation pump 150 and intake tube 145 are disposed within the main frame 105. For example, the circulation pump 150 can be disposed within the solution chamber 115. In other embodiments, the circulation pump can be disposed in a separate chamber or platform below the solution chamber 115.

Figure 1B:
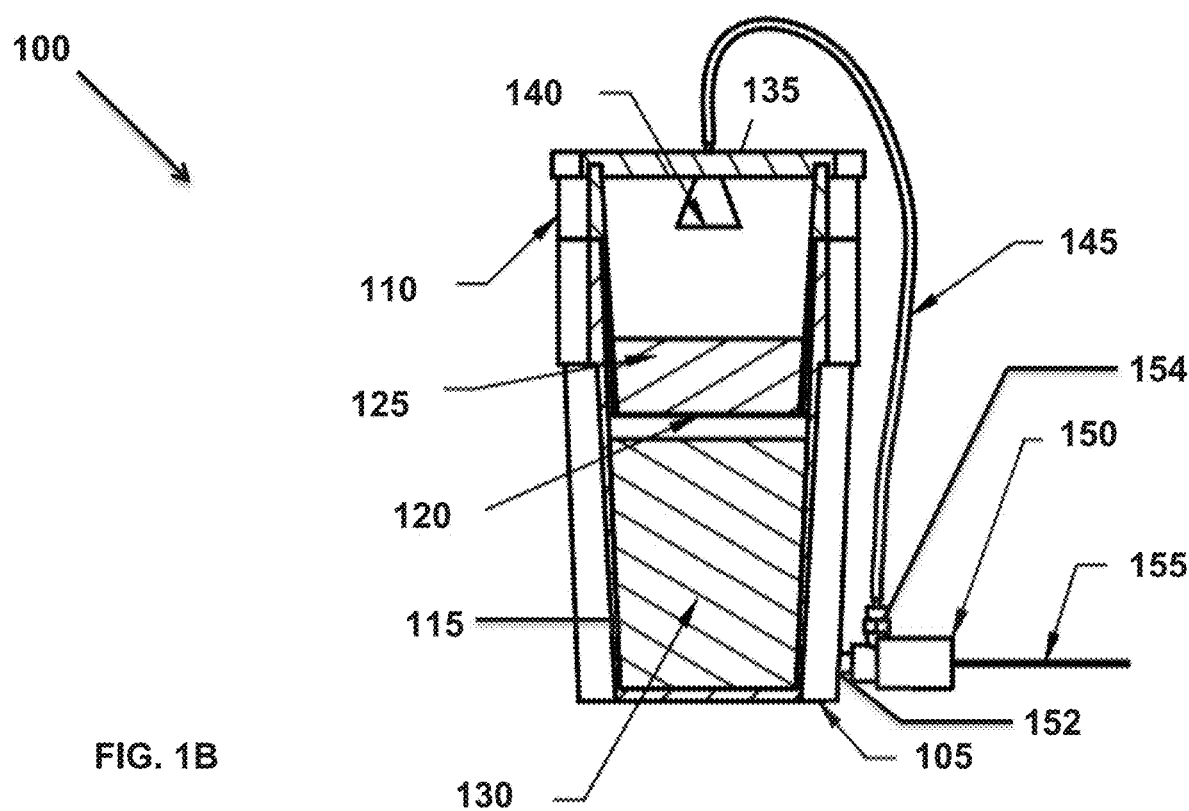
FIG. 1B presents a cross-sectional view of the heatless system of FIG. 1A, the cross-section being cut along the A-A axis.
Figure 2:
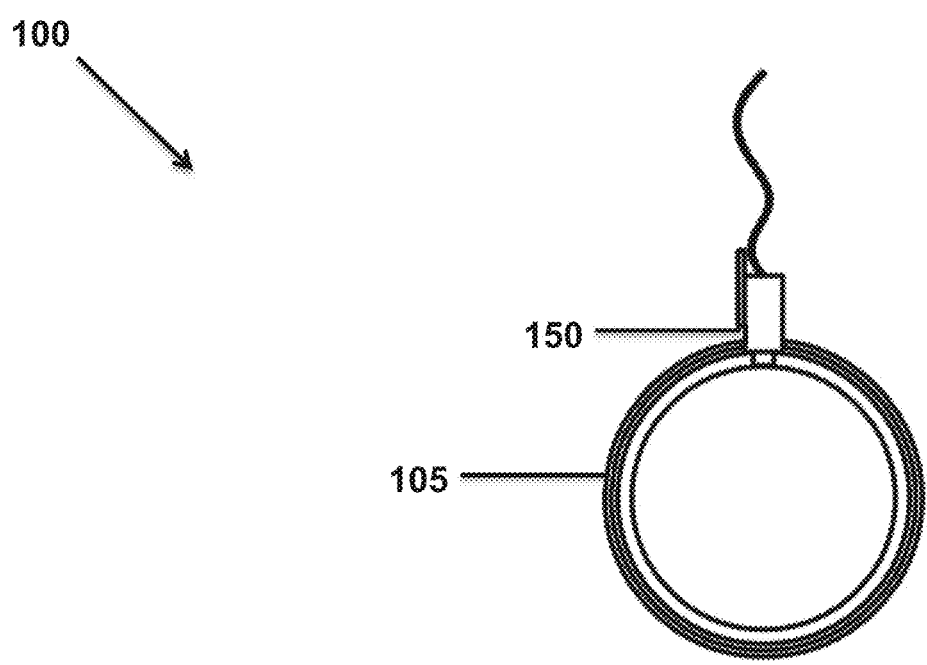
FIG. 2 presents a bottom view of the heatless system of FIG. 1A.
Figure 3A:
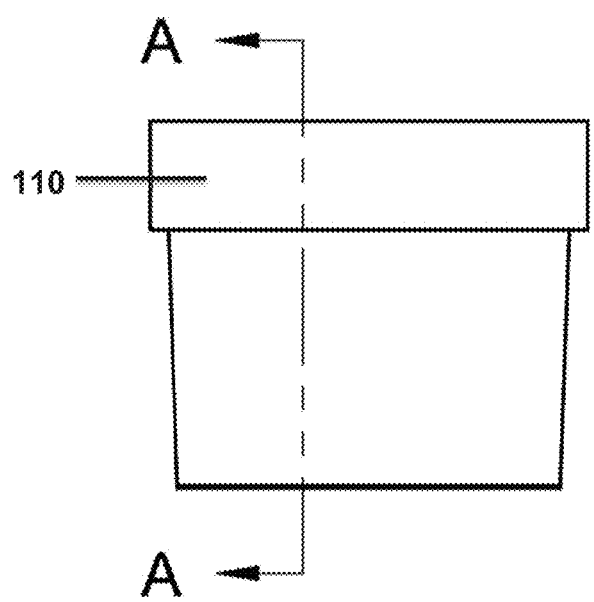
FIG. 3A presents a front view of an exemplary brewing chamber according to one or more embodiments described herein.
Figure 3B:
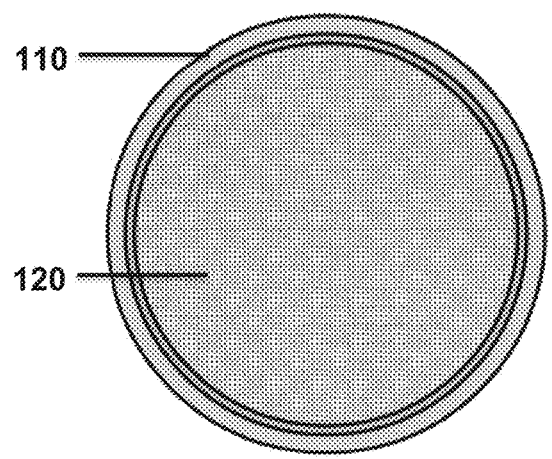
FIG. 3B presents a top view of an exemplary brewing chamber according to one or more embodiments described herein.

The system 100 performs brewing by setting up the system as in FIGS. 1A and 1B and circulating the solvent 130 into the brewing chamber 110 via the nozzle 140. A portion of the solvent 130 passes through the filter 120 and back into the solution chamber 115, where it is recycled by the circulation pump 150 into the brewing chamber. Simultaneously, another portion of the solvent 130 combines with the soluble 125, covering it and creating a partial solution of soluble and solvent. A static equilibrium may be created between the amount of solvent 130 passing through the filter and the amount of solvent contributing to the flavor extraction from the soluble. System 100 repeats this process to increase the concentration of soluble flavor in the partial solution over time. This continuous recycling process means that a desired soluble concentration can be achieved with reduced soluble amount as compared to conventional methods while extracting full flavor, aroma, and caffeine content in the case of coffee.

In one or more embodiments, the system 100 continues to brew for a set period of time. In one or more embodiments, the system 100 continues to brew until a desired solution is reached, as measured by particle suspension or other methods. Particle suspension can be measured using a total dissolved solids (TDS) meter via conductivity or a refractometer via light. A user can set system 100 for different desired solutions depending on the user's desired strength and taste of the produced solution. This reduces the risk of over-steeping and reduces the time the operator is needed on the machine.

In one or more embodiments, the system 100 can include a serving valve, and/or a water filter to remove small particles of soluble 125 that pass through the filter 120 (not shown). A serving valve can be coupled to the outer surface of the system 100, the serving valve having access to the brewed solution. The serving valve can be of any type known in the art. The serving valve can further include a spigot for dispensing solution. In one or more embodiments, the system 100 further includes a pump inlet filter. The pump inlet filter can be coupled to the serving valve, the spigot, or both.

Figure 4:
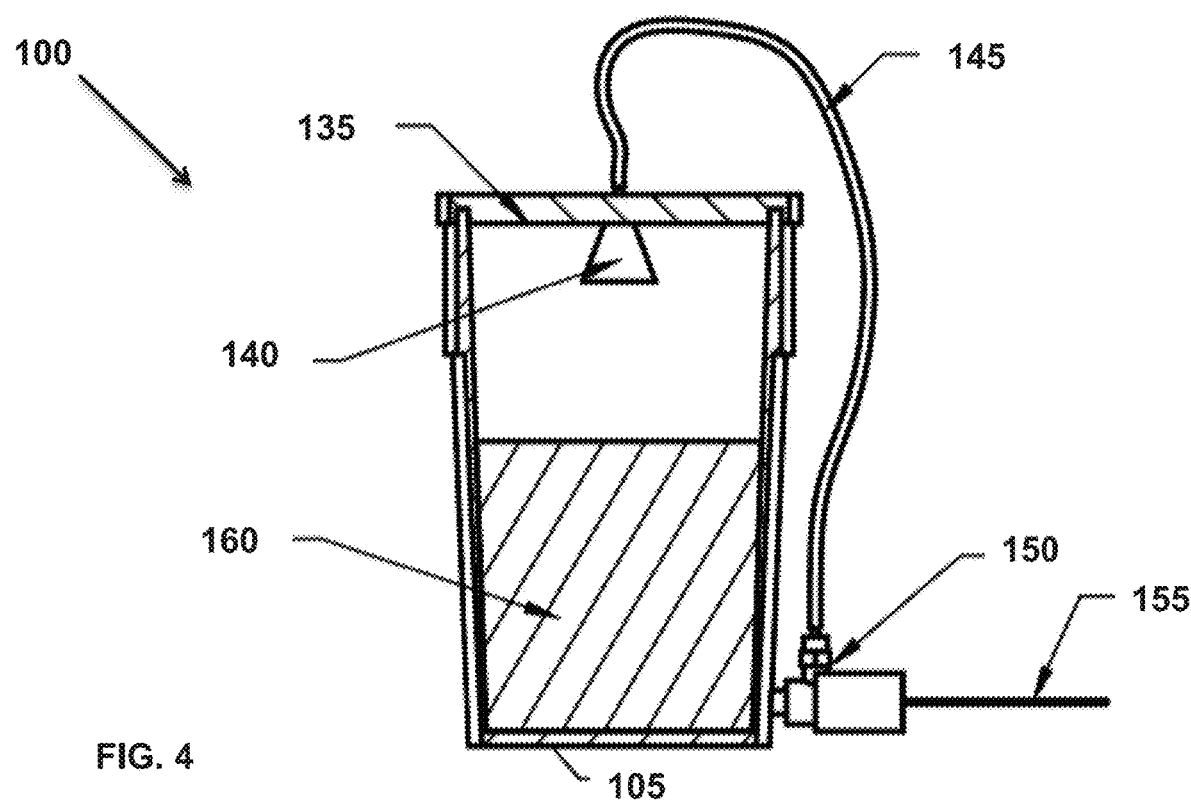
FIG. 4 presents a cross-sectional view of the heatless system of FIG. 1A in a batch storage mode.

Turning now to FIG. 4, once the system 100 completes a brewing cycle (i.e., a desired concentration of a solution is achieved), the system can be converted for storage. The brewing chamber 110 is removable such that any remaining soluble 125 can be removed from the system and only the final result remains, that is, the solution 160. Removal of the brewing chamber 110 then ensures that the concentration of the solution 160 will not increase during storage. Optionally, a refrigeration system (not shown) can be implemented in system 100 to increase the storage time of the brewed solution 160.

Figure 5A:
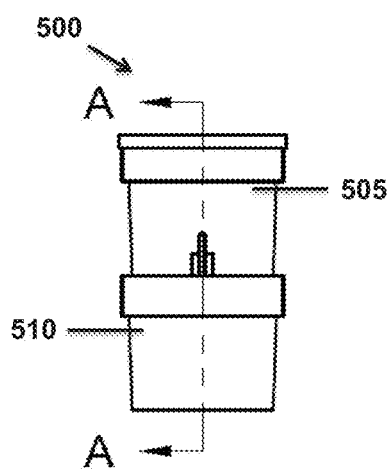
FIGS. 5A, 5B, and 5C present a heatless system for extracting a soluble by a solvent to form a solution according to one or more additional embodiments.
Figure 5B:
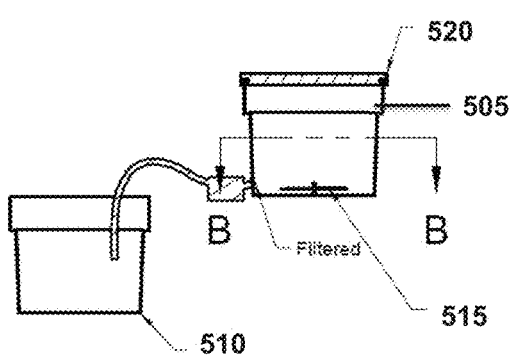
Figure 5C:
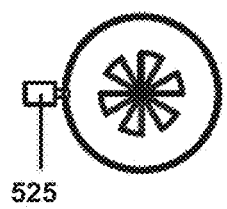

The present disclosure is not limited to agitation methods in which agitation is performed by spraying a solvent through a nozzle and continuously recirculating the produced partial solution with the solvent. Other agitation methods and other agitation mechanisms are contemplated. For example, turning to FIGS. 5A-5C, a system 500 for rapid extraction of flavor from a soluble by a solvent using a mixing device 515 for agitation is provided. The system 500 includes a first brewing chamber 505 for performing agitation and a second brewing chamber 510 for collecting brewed solution. The two chambers are sized and shaped to couple and decouple depending on whether the system is pre-brewing, brewing, or post-brewing. In one or more embodiments, the first brewing chamber 505 and the second brewing chamber 510 perform brewing in a coupled state, as shown in FIG. 5A. In one or more embodiments, the first brewing chamber 505 and the second brewing chamber 510 perform brewing in a de-coupled state, as shown in FIG. 5B. In either case, the soluble and solvent are both inserted in the first brewing chamber 505 when the first brewing chamber is in a powered off state. A removable lid 520 is coupled to the top end of the first brewing chamber 505 to stop possible spillage.

The system 500 is then energized (e.g., by a motor, not shown) and the mixing device 515 agitates the solvent and soluble. The mixing device 515 can be any number of suitable devices for mixing the solvent with the soluble, such as a beater, propeller, magnetic mixer, blade, water jet, or the like. The system 500 continues agitation for either a preset time (e.g., 2-4 hours) or until a desired time/particle suspension is reached. In one or more embodiments, the system 500 includes a valve/strainer 525 that is coupled to either the first brewing chamber 505 or the second brewing chamber 510 that opens to allow the solution to pass through and the remaining soluble to be cleaned out of the first chamber 505.

It should be appreciated that as the brewing chambers can be coupled and de-coupled, system 500 can include arrangements in which the brewing chambers are not mounted on top of one another. For example, the brewing chambers can be arranged side-by-side. In one or more embodiments, the brewing chambers can be placed into a supporting platform. The supporting platform can include slots sized and shaped to receive the chambers. In one or more embodiments, the supporting platform can house the circulation pump or other agitating device. Additionally, the supporting platform can house an intake tube, motor, or the like for facilitating agitation.

Figure 6A:
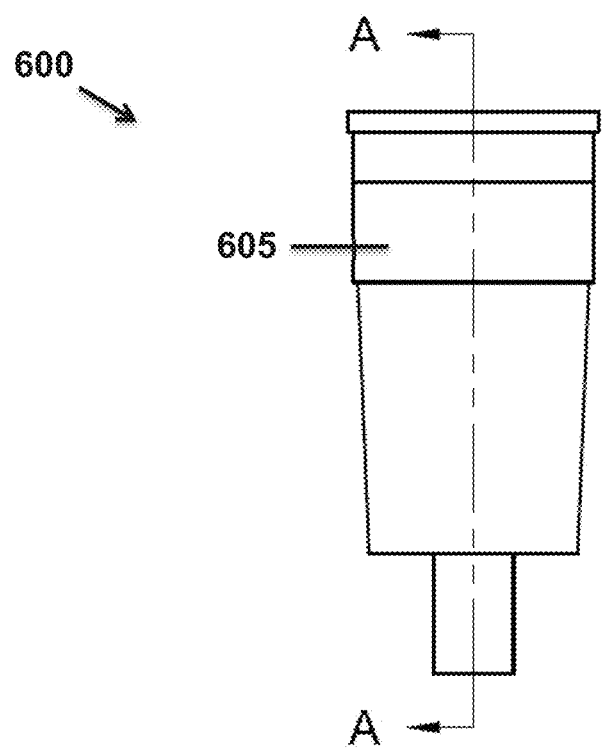
FIGS. 6A, 6B, 6C, and 6D present a heatless system for extracting a soluble by a solvent to form a solution according to one or more additional embodiments.
Figure 6B:
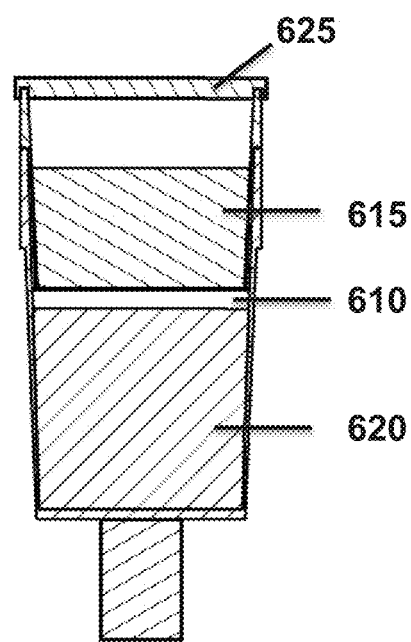
Figures 6C, 6D:
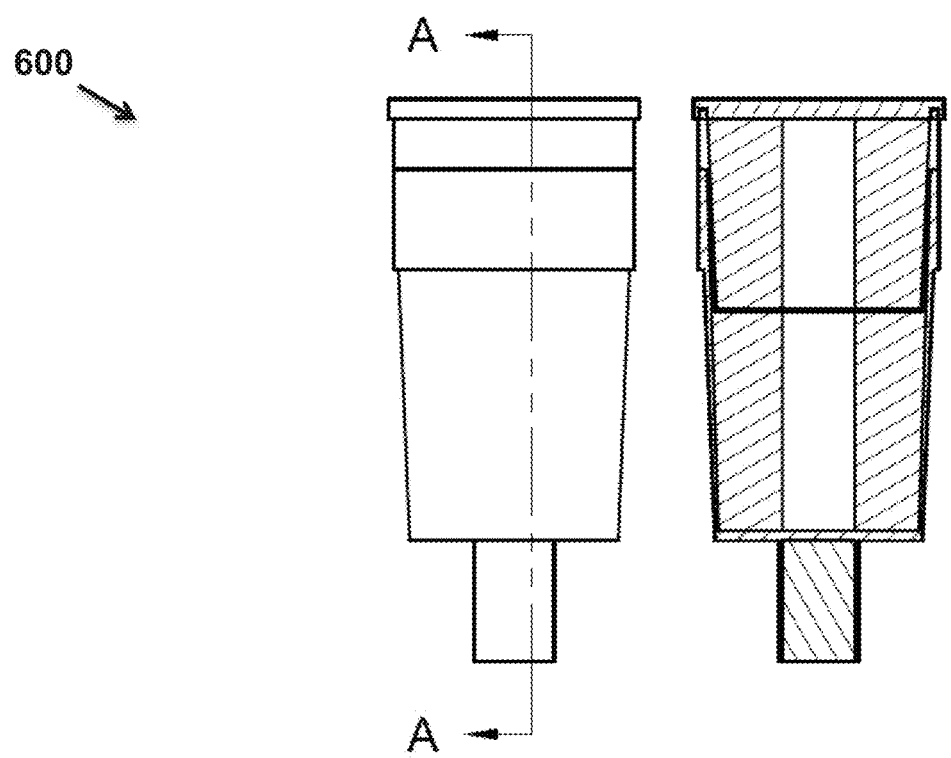

Additionally, as shown by FIGS. 6A-6D, provided herein is a system 600 for rapid extraction of flavor from a soluble by a solvent by agitating the solvent over the solution by rotating one or more brewing chambers to cause the solvent to contact the soluble. The system 600 includes a hollow main frame 605 having a permeable boundary 610 disposed within. In one or more embodiments, the main frame 605 is open at one end. The permeable boundary 610 separates a first brewing chamber 615 and a second brewing chamber 620, which each reside in the main frame 605. The brewing chambers of system 600 are not rigidly coupled to the main frame 600, but are capable of rotating about the longitudinal axis of the main frame 605, as shown by the axis A-A in FIG. 6A. A soluble is inserted into the first brewing chamber 615, and a solvent is inserted into the second brewing chamber 620. The system 600 further includes a removable lid 625 that is coupled to the open end of the main frame 605 to stop possible spillage. In order to rotate one or more of the first and second brewing chambers, a motor (not shown) is mechanically coupled to the desired rotatable brewing chamber. When powered, the motor spins either first brewing chamber 615, second brewing chamber 620, or both brewing chambers. Chamber rotation generates a centrifugal force, which causes the solvent to create a vortex as shown in FIGS. 6C and 6D. As the chambers spin, the solvent and soluble mix through the solvent permeable boundary 610. During agitation, the rotational speed of the brewing chambers can be varied by changing the momentum provided by the motor to agitate the solvent and solution to a desired brewing concentration. After a preset time, program, or particle suspension is reached, the solution separates from any remaining soluble though the permeable boundary 610 into the second brewing chamber 620.

Figure 7A:
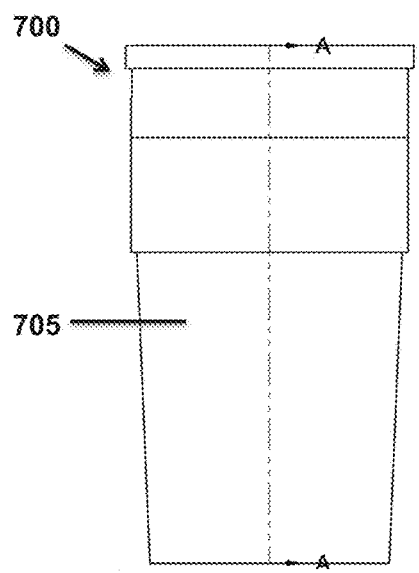
FIG. 7A presents a front view of a heatless system for extracting a soluble by a solvent to form a solution according to one or more embodiments described herein.
Figure 7B:
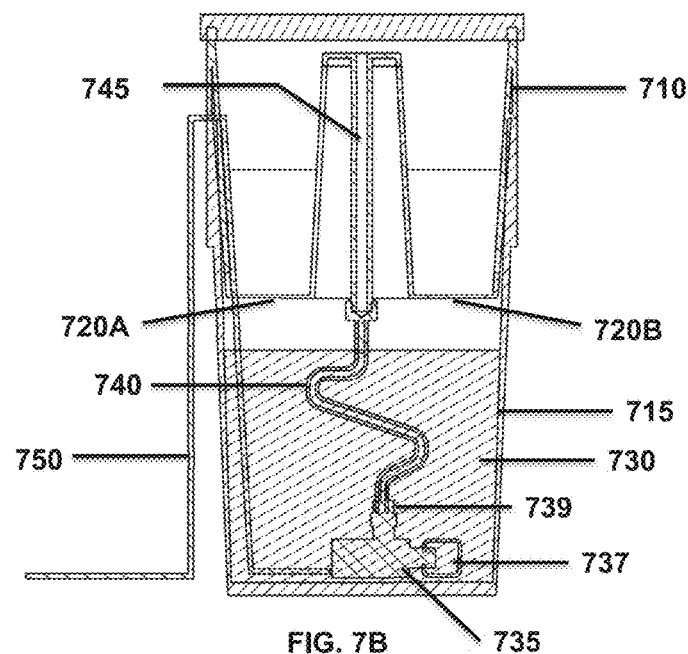
FIG. 7B presents a cross-sectional view of the heatless system of FIG. 7A, the cross-section being cut along the A-A axis.

With reference now to FIGS. 7A-B, provided herein is a heatless system 700 for rapid extraction of flavor from a soluble by a solvent in one or more embodiments. The system 700 includes a main frame 705 that houses the brewing process. The main frame 705 can be made out of various materials, including plastic, aluminum, steel or other metals, or other suitable materials. In one or more embodiments, the main frame is an elongated hollow container. A first chamber 710 and a second chamber 715 are disposed within the main frame 705. In certain embodiments, the first chamber 710 is a brewing chamber and the second chamber is a solution chamber. In other embodiments, each chamber can be considered a brewing chamber. Each of these chambers can be made out of various materials, including the same or different materials as the main frame 705, such as plastic, aluminum, steel or other materials. Each chamber is hollow to be able to store soluble or solvent materials, and the resultant solution of brewing methods implemented by system 700. For example, the soluble that has the flavor to be extracted can be located in the first chamber 710 (not shown), and a solvent 730 can be located in the second chamber 715 and pumped into the first chamber to extract the flavor from the soluble. As the solvent is pumped through system 700 between the chambers, gradually a solution mixture is formed having the extracted flavor of the soluble.

To facilitate flavor extraction, one or more filters 720A, 720B, etc. provide a solvent permeable boundary for the solvent to pass over the soluble to form the partial solution. In one or more embodiments, the filters 720 are membranes capable of allowing solvent and solution to pass through the filter, while retaining soluble. For example, the filters 720 are formed of cheese cloth, metal grating, nut milk sack or other similar filtering device. In one or more embodiments, the filters 720 separate the first brewing chamber 710 and the second chamber 715. In one or more embodiments, the filters 720 are a single circular filter having an opening for tubing or a passageway to pass through for solvent to be pumped between the chambers. In other embodiments, the first chamber 710 is separated by a physical passageway thereby creating two or more smaller chambers, each of which have an individual filter 720. In one or more embodiments, the soluble is disposed in the first chamber 710 on or adjacent to the filters 720.

In one or more embodiments, the soluble is coffee grounds and the solvent is water. The type of filter 720 is selected to retain the soluble in the first chamber 710 as the system 700 agitates the solvent over the soluble. In the exemplary embodiment shown by FIGS. 7A-7B, the solvent is agitated via a circulation pump 735 disposed in the second chamber 715. The circulation pump 735 is a pump as is known in the art for receiving a liquid (e.g., the solvent) and pushing it in a direction against gravity. In one or more embodiments, the circulation pump 735 is powered by a power supply 750. The circulation pump has an inlet 737 for receiving solvent and/or solution mixture in the second chamber 715, and an outlet 739 for pumping the solvent and/or solution back to the first chamber 710. In one or more embodiments, the outlet 739 is coupled to an intake tube 740 that leads to the first chamber 710. The intake tube 740 can be arranged with the first chamber 710 in different ways. For example, the intake tube 740 can be coupled at the boundary between the first chamber 710 and the second chamber 715. This arrangement permits the solvent to be forcefully sprayed into the first chamber 710. In an advantageous arrangement as shown by FIG. 7B, the intake tube 740 is coupled to the end of a passageway 745. This passageway 745 permits the solvent to be sprayed into the first chamber 710 from a height above the soluble, thereby providing better control of the solvent flow to achieve a more desirable solution mixture. In one or more embodiments, a nozzle is coupled to the end of the intake tube 740 or the end of the passageway 745 to aid in delivering the solvent.

The system 700 performs brewing by setting up the system as in FIGS. 7A and 7B and circulating the solvent into the first chamber 710 through the intake tube 740 and the passageway 745. The solvent fills the first chamber 710, covering the soluble and draining through the filters 720 and back into the second chamber 715, creating a partial mixed solvent/soluble solution. Thereafter, the mixed solution is continuously recycled by the circulation pump 735 between the brewing chambers. A static equilibrium may be created between the amount of solvent passing through the filter 720 and the amount of solvent contributing to the flavor extraction from the soluble. System 700 repeats this process to increase the concentration of soluble flavor in the partial solution over time. This continuous recycling process means that a desired soluble concentration can be achieved with reduced soluble amount as compared to conventional methods while extracting full flavor, aroma, and caffeine content in the case of coffee.

In one or more embodiments, the system 700 can include a serving valve, and/or a water filter to remove small particles of soluble that pass through the filter 720 as described elsewhere herein (not shown). In one or more embodiments, the main frame 705 can include a pouring spout.

Figure 8:
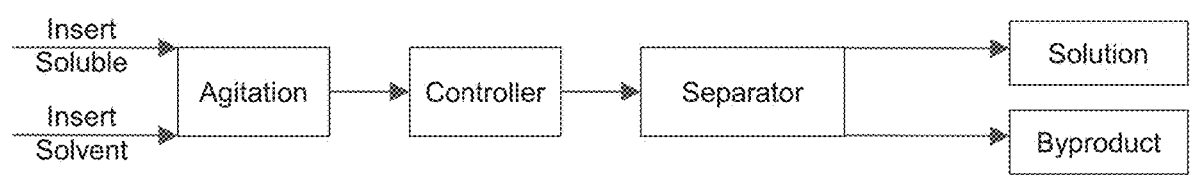
FIG. 8 presents a flow diagram of an exemplary method for heatless extraction of a soluble by a solvent to form a solution according to one or more embodiments described herein.
Figure 9:
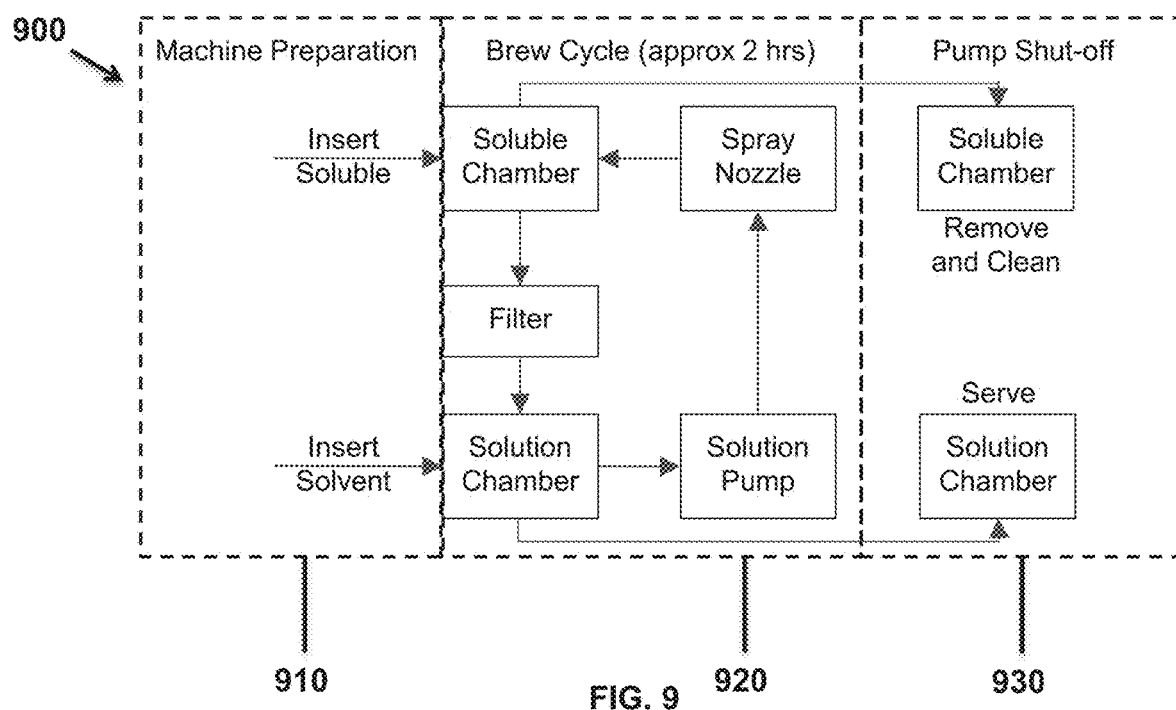
FIG. 9 presents a flow diagram of an exemplary method for heatless extraction of a soluble by a solvent to form a solution according to one or more embodiments described herein.

With reference now to FIGS. 8-9, a method for heatless extraction of flavor from a soluble by a solvent according to one or more embodiments is provided. The method implements a system, such as system 100 or system 700, to produce a concentrated solution that includes the flavor of the soluble via diffusion of the solvent. FIG. 9 illustrates a method 900 including steps that fall under three primary categories: (1) machine preparation 910; (2) a brew cycle 920; and (3) post brewing 930. In machine preparation 910, a soluble and a solvent are provided to the system. For example, a soluble is provided to a brewing chamber, and the solvent is provided to a solution chamber, in which a filter separates the two chambers. Next, the method begins the brew cycle 920. In the brew cycle 920, the method performs agitation to begin mixing the solvent and the soluble to create a solution. Agitation is accomplished by a controller in various ways as described elsewhere herein, including by spraying the solvent on the soluble, by using a mixing device (e.g., beaters, propellers, magnetic mixers, etc.), by mechanically agitating the chamber containing the soluble as solvent is added, by vacuuming out the brewing chamber, forcing solvent on the soluble and pushing the solution through a strainer, or some combination of the above. Once mixing begins, the method implements a separator component to minimize the amount of soluble particles that are passed to the solution. For example, the separator component can be a filter (e.g., filter 120). Thereafter, the method continues agitation and separation until the partial solution reaches a desired concentration of solution. The method may produce byproduct (e.g., leftover soluble), which is removed from the system in post-brewing. In post-brewing 930, the circulation pump is shut off. Optionally, the brewing chamber can be removed from the system and cleaned. The solution chamber having the brewed solution remains in the system and can be served thereafter.

Figure 10A:
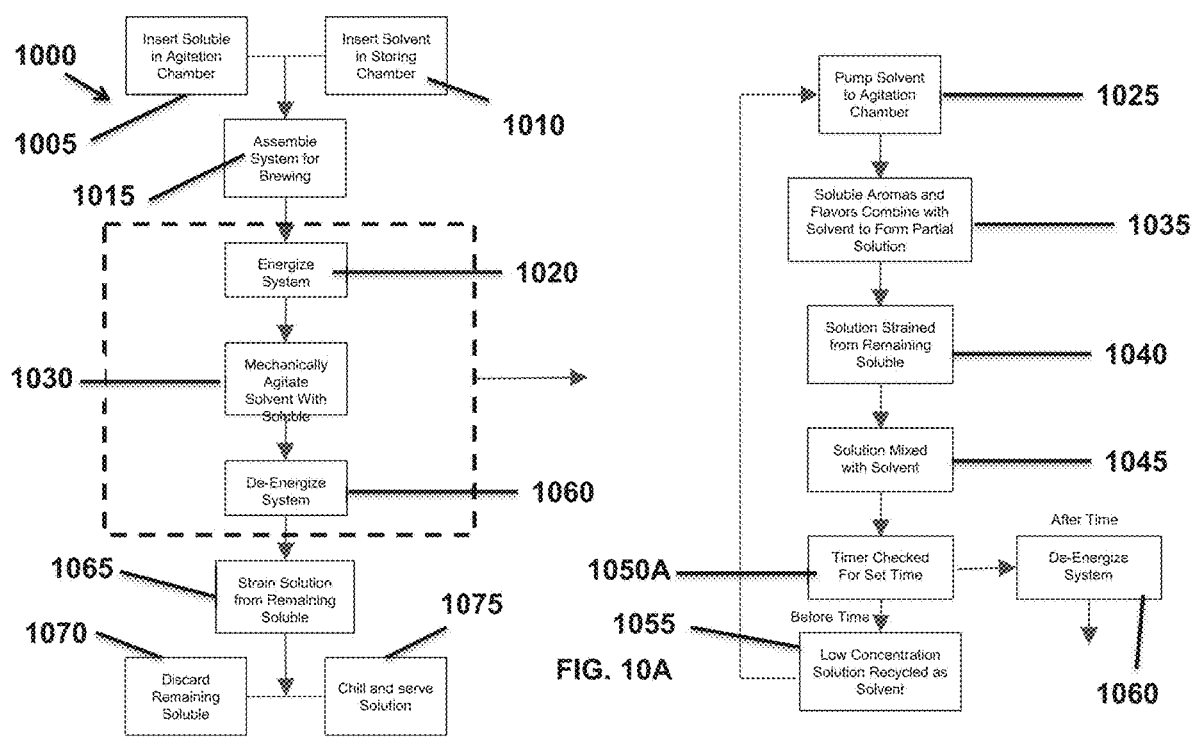
FIG. 10A presents a flow diagram of an exemplary method for heatless extraction of a soluble by a solvent to form a solution according to one or more embodiments described herein.
Figure 10B:
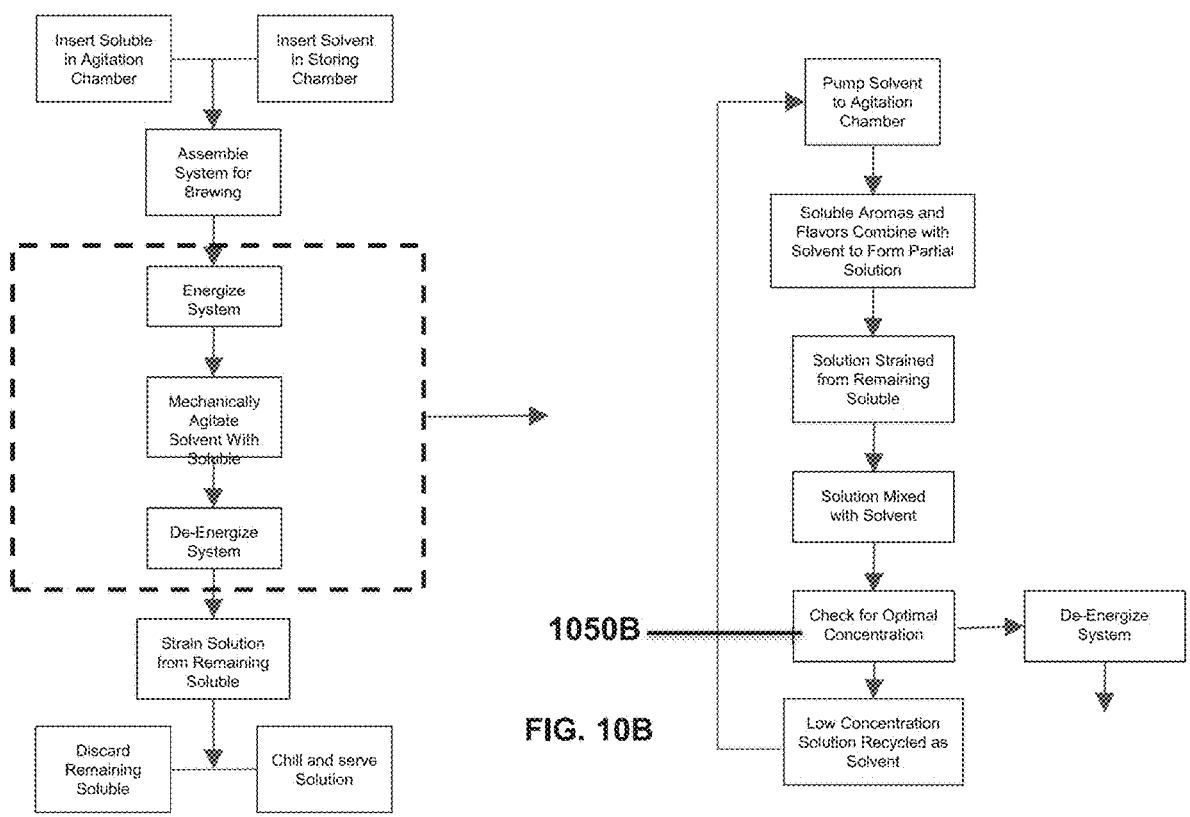
FIG. 10B presents a flow diagram of another exemplary method for heatless extraction of a soluble by a solvent to form a solution according to one or more embodiments described herein.

Turning now to FIGS. 10A-10B, an exemplary method 1000 for heatless extraction of flavor from a soluble by a solvent in a system according to one embodiment is provided. The method begins by inserting a soluble into an agitation chamber (e.g., brewing chamber 110, first chamber 710), step 1005, and inserting a solvent into a storing chamber (e.g., solution chamber 115, second chamber 715), step 1010. The agitation chamber is then assembled with the solution chamber to form a brewing system, step 1015. Advantageously, the chambers can be sized and shaped to interlock with one another. In one or more embodiments, the agitation chamber is assembled on top of the storing chamber. For example, the agitation chamber and storing chamber are assembled within a main frame. In other embodiments, the agitation chamber is assembled side-by-side with the storing chamber. For example, each chamber can be secured in a platform sized and shaped to receive each chamber.

Next, the method as illustrated by FIGS. 10A-10B performs a series of steps to energize the system, step 1020, mechanically agitate the solvent with the soluble, step 1030, and then de-energize the system. To energize the system at step 1020, the method first pumps solvent to the agitation chamber, step 1025. Once the solvent reaches the agitation chamber, the method mechanically agitates the solvent with the soluble, step 1030, such as by spraying the solvent through a nozzle. This causes the aromas and flavors of the soluble to combine with the solvent to form a partial solution, step 1035. The method continues by straining the partial solution from the remaining soluble, step 1040. For example, a filtering device can perform this step. Then, the partial solution mixes with the remaining solvent in the storing chamber, step 1045. After the mixing step, the method determines whether the brewing cycle is complete. The method can accomplish this in different ways. In one or more embodiments, the method checks whether a pre-determined time period has elapsed since energizing the system. For example, the system includes a timer that is set upon turning on a circulation pump that is set for a time period chosen to produce a solution batch having particular characteristics, step 1050A. In one or more embodiments, the method checks whether the mixed solution has an optimal concentration, step 1050B, as in FIG. 10B. For example, the method measures the particle suspension of the solution. Particle suspension can be measured using a total dissolved solids (TDS) meter via conductivity or a refractometer via light.

In the event that the method determines that the brewing cycle is not yet complete, e.g., the time period has not elapsed or the measured particle suspension is not at the optimal concentrations, the method continues at step 1055 by recycling the solution as solvent. For example, the low concentration solution is pumped back through the intake tube of the system by the circulation pump. In the event that the method determines that the brewing cycle is complete, the method then de-energizes the system, step 1060. De-energizing the system includes turning off the power supply powering the circulation pump or implementing a shut-off switch of some type, as is known in the art. Once the system is de-energized, the method strains any solution from the remaining soluble at step 1065. The system operator then can discard remaining soluble that is not suitable for further brew cycles, step 1070, and/or chill and serve the solution stored in the storing chamber, step 1075.

Figure 11:
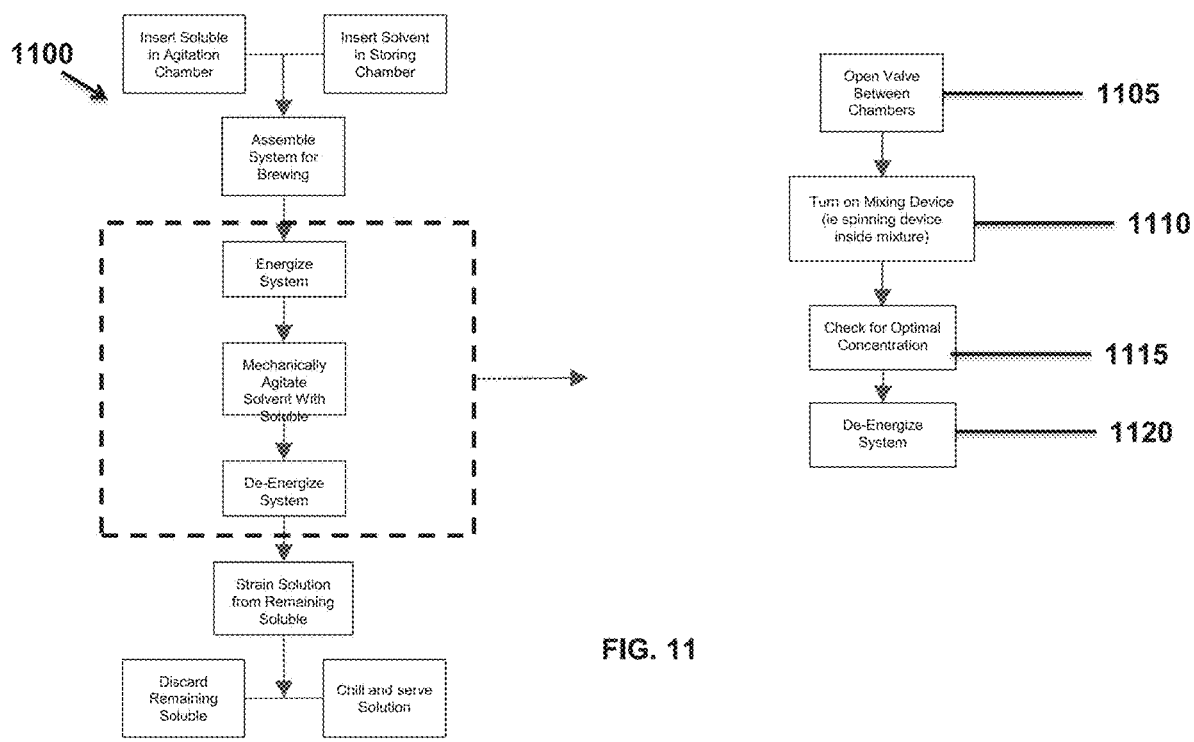
FIG. 11 presents a flow diagram of another exemplary method for heatless extraction of a soluble by a solvent to form a solution according to one or more embodiments described herein.

With reference now to FIG. 11, an exemplary method 1100 for heatless extraction of flavor from a soluble by a solvent in a system according to one embodiment is provided. The method illustrated by FIG. 11 includes the same broad steps as the method illustrated in FIGS. 10A-10B, except that the steps of energizing the system, and mechanically agitating the solvent with the soluble are different. To energize the system, first, an opening is created between the two chambers, step 1105. For example, a valve is opened that separates the agitation chamber and the storing chamber. In this way, the solvent is able to flood the agitation chamber. The method continues by activating a mixing device, step 1110. The mixing device can be, for example, one or more, beaters, propellers, magnetic mixers and/or other devices having spinning blade technology to stir the solvent in the agitation chamber. As in the method of FIGS. 10A-10B, the method then waits for a predetermined amount of time to elapse or checks for an optimal solution concentration, step 1115. Once either of these conditions is satisfied, the method de-energizes the system, step 1120, strains the solution from any remaining soluble, and then discards remaining soluble and/or chills and serves the solution.

Figure 12:
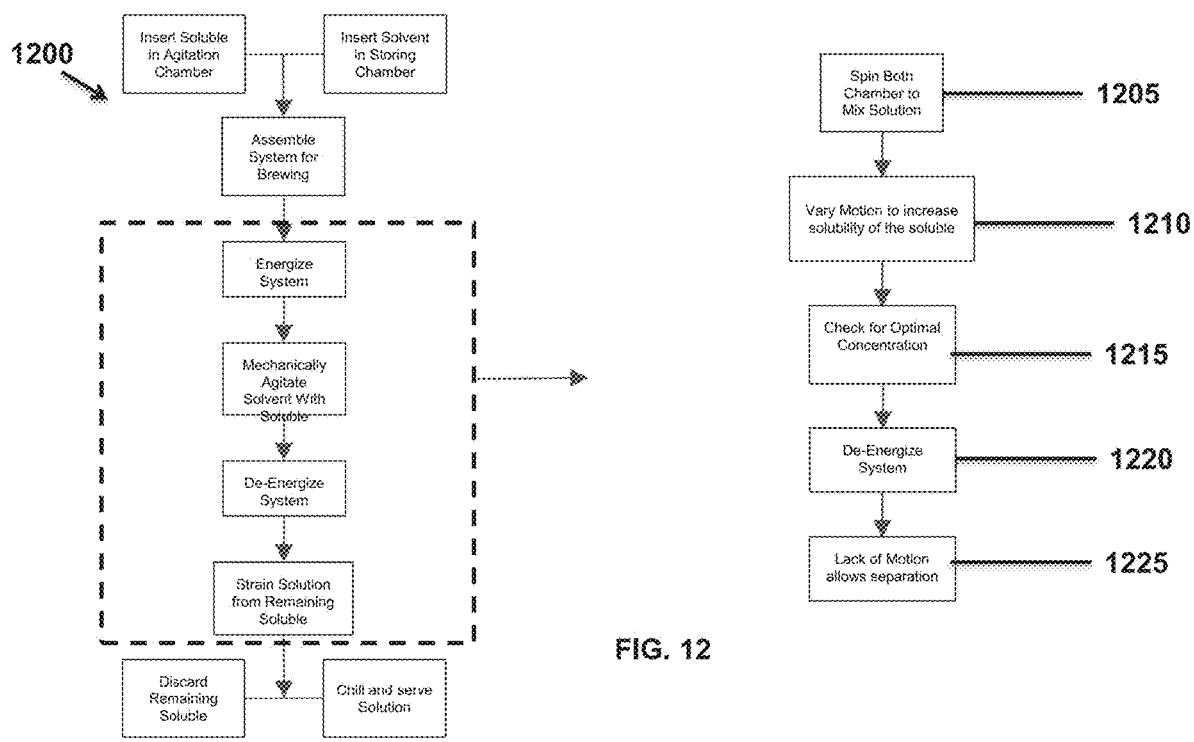
FIG. 12 presents a flow diagram of another exemplary method for heatless extraction of a soluble by a solvent to form a solution according to one or more embodiments described herein.

With reference now to FIG. 12, an exemplary method 1200 for heatless extraction of flavor from a soluble by a solvent in a system according to one embodiment is provided. The method illustrated by FIG. 12 includes the same broad steps as the method illustrated in FIGS. 10A-10B, except that the steps of energizing the system, and mechanically agitating the solvent with the soluble are different, and that the step of straining the solution from the remaining soluble is implicitly accomplished upon de-energization of the system. To energize the system in the method illustrated by FIG. 12, one or both of the agitation chamber and storing chamber are spun, step 1205. This mixes the solvent with the soluble through openings and filters separating the chambers to create a partial solution. In one or more embodiments, the method varies the motion of the chambers to increase the solubility of the soluble, step 1210. This continues until the method determines whether a pre-determined time period has elapsed or an optimal concentration has been determined, step 1215. At that point, the method de-energizes the system, step 1220, such as by turning off motors that power the spinning of the chambers. As the solution settles, the lack of motion of the chambers allows for separation of the solution from the undissolved soluble, step 1225. Thereafter, an operator can discard the remaining soluble and/or chill and serve the solution.

Figure 13:
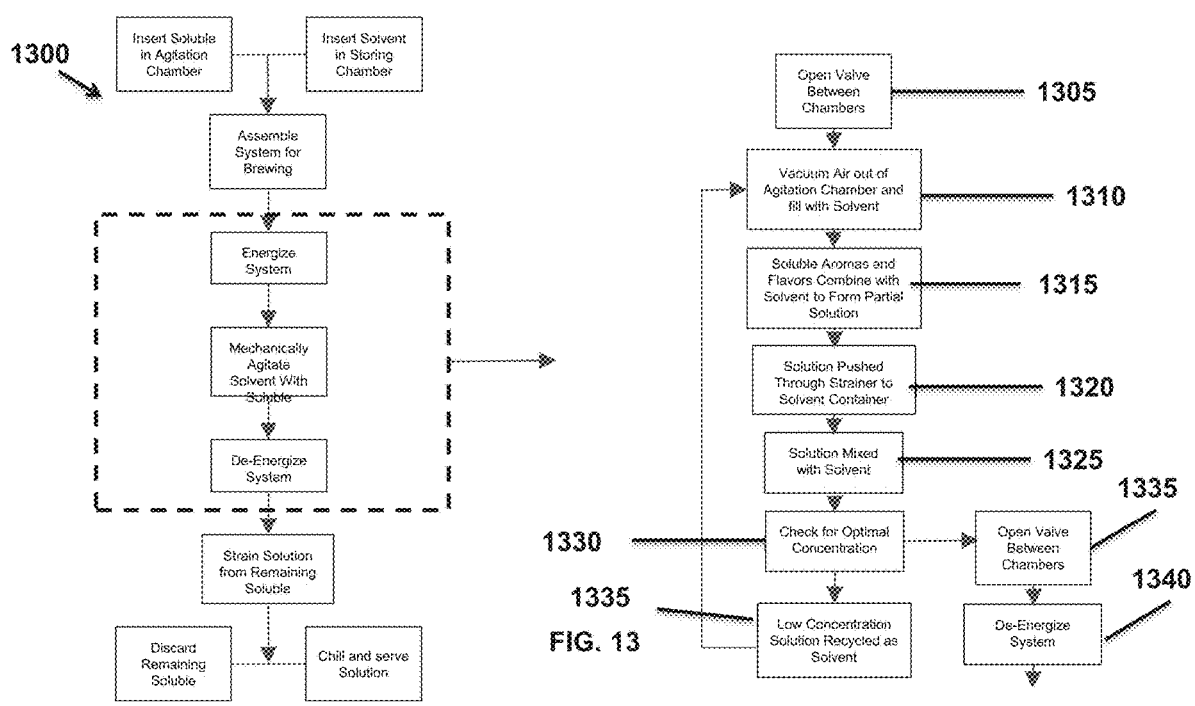
FIG. 13 presents a flow diagram of another exemplary method for heatless extraction of a soluble by a solvent to form a solution according to one or more embodiments described herein.

With reference now to FIG. 13, an exemplary method 1300 for heatless extraction of flavor from a soluble by a solvent in a system according to one embodiment is provided. The method illustrated by FIG. 13 includes the same broad steps as the method illustrated in FIGS. 10A-10B, except that the steps of energizing the system, and mechanically agitating the solvent with the soluble are different. To energize the system in the method illustrated by FIG. 13, a valve is opened between the agitation chamber and the storing chamber, step 1305. The method then vacuums air out of the agitation chamber, step 1310. The vacuumed agitation chamber is thereafter filled with solvent, step 1315. In one or more embodiments, the filling of solvent can be via injection, such as with a syringe. The method allows the aromas and flavors of the soluble to combine to form a partial solution. Next, the partial solution is pushed through a strainer to the storing chamber, step 1320, in which the partial solution mixes with the solvent. Like other methods described herein, at step 1325, the method determines whether a pre-determined time period has elapsed or an optimal concentration has been determined, step 1330. If neither of those conditions are met, the solution is recycled to the vacuumed agitation chamber as solvent at step 1335. If either condition is met, depending on the embodiment, a valve is opened between the chambers and the system is de-energized, steps 1335-1340. The method then strains solution from the remaining soluble. Finally, an operator can choose to discard remaining soluble and/or chill and serve the solution.

FIGS. 1 through 13 are conceptual illustrations allowing for an explanation of the present invention. The foregoing description of the specific embodiments will so fully reveal the general nature of the disclosure that others can, by applying knowledge within the skill of the relevant art(s) (including the contents of the documents cited and incorporated by reference herein), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A heatless system for extracting a soluble substance in a solvent to form a solution comprising:
    a first brewing chamber and a second brewing chamber;
    one or more solvent-permeable filters contained in the first brewing chamber;
    a circulation pump having an inlet and an outlet;
    an intake tube having a first end and a second end, the first end coupled to the outlet of the circulation pump and the second end coupled to the first brewing chamber;
    an agitation mechanism disposed in the first brewing chamber; and
    wherein the solvent is initially disposed in the second brewing chamber and the soluble substance is initially disposed in the first brewing chamber,
    wherein the circulation pump facilitates the flow of the solvent through the intake tube to the first brewing chamber from the second brewing chamber and wherein the agitation mechanism causes the solvent to mix with the soluble substance to form a solution, and
    wherein the solution passes through the one or more solvent-permeable filters into the second brewing chamber.

2. The heatless system according to claim 1, wherein the second end of the intake tube is coupled to a passageway at the first brewing chamber.

3. The heatless system according to claim 1, further comprising a main frame housing the first brewing chamber and the second brewing chamber.

4. The heatless system according to claim 1, further comprising a supporting platform having slots sized and shaped to receive the first brewing chamber and the second brewing chamber.

5. The heatless system according to claim 4, wherein the circulation pump is disposed within the supporting platform.

6. A method of heatlessly extracting a soluble substance in a solvent to form a solution, the method comprising:
    (a) inserting the soluble substance into a first brewing chamber;
    (b) inserting the solvent in a second brewing chamber;
    (c) circulating, by a circulation pump, the solvent from the second brewing chamber to the first brewing chamber through an intake tube having a first end and a second end, the first end coupled to an outlet of the circulation pump and the second end coupled to the first brewing chamber;
    (d) mechanically agitating the solvent with the soluble substance such that the solvent mixes with at least a portion of the soluble substance to form a partial solution;
    (e) straining the partial solution through a filter in the first brewing chamber into the second brewing chamber;
    (f) mixing the partial solution with the solvent in the second brewing chamber; and
    (g) circulating the partial solution with the solvent into the first brewing chamber.

7. The method of claim 6, further comprising:
    repeating steps (c)-(g) until the partial solution reaches a desired concentration.

8. The method of claim 6, further comprising:
    repeating steps (c)-(g) for a set time.

9. The method of claim 6, wherein the step of circulating the solvent includes:
    pumping the solvent through an intake tube; and
    spraying, via a nozzle, the solvent on the soluble.

10. The method of claim 6, wherein the step of circulating the solvent includes:
    pumping the solvent through an intake tube; and
    rotating the first brewing chamber about a longitudinal axis of the first chamber as solvent is added.

11. The heatless system of claim 1, wherein the first brewing chamber is coupled to a motor configured to rotate the first brewing chamber about a longitudinal axis of the first chamber as solvent is added.

12. The heatless system of claim 1, wherein the agitation mechanism is one or more of: a beater, a propeller, a magnetic mixer, or a blade.

13. The heatless system of claim 1, further comprising a timer.

14. The heatless system of claim 11, further comprising a serving valve.

15. A heatless system for extracting a soluble substance in a solvent to form a solution comprising:
    a first brewing chamber and a second brewing chamber;
    one or more solvent-permeable filters contained in the first brewing chamber;
    a circulation pump having an inlet and an outlet;
    an intake tube having a first end and a second end, the first end coupled to the outlet of the circulation pump and the second end coupled to a nozzle disposed at the inner surface of the first brewing chamber; and
    wherein the solvent is initially disposed in the second brewing chamber and the soluble substance is initially disposed in the first brewing chamber,
    wherein the circulation pump facilitates the flow of the solvent through the intake tube to the first brewing chamber from the second brewing chamber and sprays the solvent through the nozzle onto the soluble substance to form a solution, and
    wherein the solution passes through the one or more solvent-permeable filters into the second brewing chamber.

\* \* \* \* \*